United States Patent Office 3,158,624
Patented Nov. 24, 1964

3,158,624
PREPARATION OF TRICHLOROFUROYL-
CHLORIDE
Edward Leon, Tonawanda, Edward D. Weil, Lewiston, and Jerome Linder, Niagara Falls, N.Y., assignors to Hooker Chemical Corporation, Niagara Falls, N.Y., a corporation of New York
No Drawing. Filed June 2, 1961, Ser. No. 114,321
5 Claims. (Cl. 260—347.3)

This invention relates to a novel oxygen containing heterocyclic composition of matter and to a novel method of preparing it.

More particularly, this invention describes trichloro-2-furoyl chloride, a heretofore unreported compound useful as an organic intermediate for the preparation of pesticidal, fungicidal and herbicidal compositions of matter.

This invention in one of its composition aspects offers the advantage of making available for the first time a reactive compound containing the useful trichlorinated oxygen heterocyclic nucleus which readily undergoes many reactions with substances containing a complementary or receptive group such as the amines, alcohols, phenols and the like, whether the compound be aliphatic, aromatic or heterocyclic, said products having value among other ways as pesticides and herbicides. While it is true that the trichloro-2-furoic acid is known, the availability of the much more reactive acid chloride offers many advantages over the free acid. For example, reactions where one of the reactants is an acid chloride will undergo all of the reactions that the free acid will, including amination, esterification, hydrolysis, and the like, and furthermore, will undergo ammonolysis or aminolysis to the amide which can only be made indirectly going through the acid. In addition, the acid chloride reacts more vigorously at lower reaction temperatures, generally requires no catalysts and will often give better yields than the acid. In this particular case, the trichloro-2-furoic acid has little practical value as an intermediate since it can only be prepared through a costly multi-step synthesis starting with furoic acid in poor yield. Thus, to prepare the acid chloride through the classical route from the free acid is not advantageous here since it requires the objectionable multi-step preparation of the acid plus an additional step of reacting the acid with a phosphorus or sulfur halide or oxyhalide. This conversion step substantially adds to the cost of preparation and also reduces the yield to a significant extent. Thus, introducing the trichloro-2-furan moiety in an another molecule cannot be economically done by any present known process since the present known method is unsatisfactory.

In its process aspect, this invention has the advantage of making available a novel and simple one-step process from a commercially available starting material, which readily lends itself to commercial exploitation and produces the desired trichloro-2-furoyl chloride in good yield substantially free of impurities. This novel process involves the thermal re-arrangement of tetrachlorocoumalin (tetrachloro-α-pyrone) to the desired trichloro-2-furoyl chloride. The starting material, tetrachlorocoumalin, is a known commercially available material having a melting point of 78.5 to eighty degrees centigrade. Its preparation has been described by Roedig and Märkl, Annalen der Chemie 636, 1–18 (1960).

The novel re-arrangement reaction involved may be written as follows:

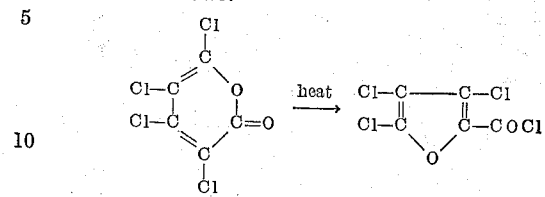

The inventive process is advantageous and surprising in several respects. It is advantageous in that the process requires only one step to go from a commercially available intermediate to the acid chloride in good yield as compared to the multi-step preparation of the acid. It is most unexpected and surprising that the acid chloride can be thus prepared considering that the conversion of no other halo-coumalins to furoyl chloride or its derivatives has been reported. It is also surprising that the reaction conditions are simple, requiring no catalyst or other reagents, merely the application of heat and the separation of product.

Yet another advantage of this invention in its process aspect is that it offers the means of introducing the herbicidally and pesticidally valuable trichloro-2-furan moiety in a molecule without resorting to a complicated synthetic route or extreme reaction conditions. For example, the trichloro-2-furoyl chloride may be reacted with a broad group of compounds aromatic, aliphatic and heterocyclic, containing reactive amino group. The structure of this type of reactant is $HNR_1R_2$, where $R_1$ and $R_2$, which may be the same or different, are chosen from the group consisting of hydrogen, alkyl, alkenyl, aryl, hydroxyl, oxygen-containing heterocycles, and other heterocycles.

The process of preparing this group of amides is, in most cases, analogous to well known and routine procedures, and is described in more detail further in this application. The trichloro-2-furoyl chloride is dissolved in an appropriate unreactive solvent such as benzene, toluene, ether, or ethylene chloride, for example, and the amine added with vigorous stirring to the acid chloride solution. Cooling can be provided where necessary. Where the amine is a solid, it is usually dissolved in a non-reactive organic solvent, but where the amine is a free flowing liquid no solvent is essential though a solvent may be added if desired. It is convenient to use two moles of the amine per mole of the acid chloride, forming one mole of the amine hydrochloride which may be removed by filtration or by water extraction, leaving the product in the solvent from which is may be isolated by evaporation or the addition of a precipitating solvent. Other means of isolation will be obvious to one skilled in the techniques of organic chemistry. Where the product is destined for herbicidal use, no further purification is necessary, although for other purposes purification may be needed. In those instances where pure product is desired, recrystallization, chromatography or the like may be resorted to.

Amongst the amides which may be made using the trichloro-2-furoyl chloride and the previously defined —$NR^1R^2$ amino reactant are two distinct groups having pronounced but different biological activities.

The first group of amides are trichloro-2-furamides of the structure:

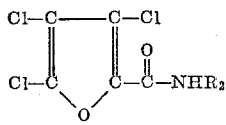

wherein $R_2$ is a monovalent organic radical selected from the group consisting of alkyl, substituted alkyl, aryl, and substituted aryl. This group of amides is substantially non-phytotoxic to higher plant life but is quite toxic to fungi and bacteria including several plant and animal parasitic species such as *Alternaria solani*.

Examples of this first group of amides which are new compositions of matter include the N-methyl, N-ethyl, N-propyl, N-butyl, N-amyl, N-hexyl, N-heptyl, N-octyl, N-nonyl, N-decyl, N-dodecyl, N-stearyl, N-heptadecyl, N-phenyl, N-chlorophenyl, N-dichlorophenyl, N-tolyl, N-xylidyl, N-chlorotolyl, N-nitrophenyl, N-naphthyl, N-furfuryl, N-picolinyl, N-benzyl, N-cyclohexyl, N-cycloheptyl, and N-cyclooctyl trichloro-2-furamides and their halogen, nitro and lower alkyl-substituted analogues. These examples are not exhaustive but merely illustrative of these inventive compositions. A preferred group of these latter fungicides having superior fungicidal activity as compared to the broad class as a whole are those having more than four carbon atoms, in the group $R_2$.

The second group of amide products of this invention are the trichloro-2-furamides of the structure:

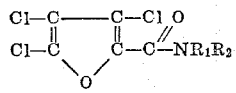

wherein R and R which may be the same or different, are either both hydrogen or are both monovalent radicals which may or may not be co-joined to form cyclic structures. These compositions, which include the known unsubstituted amide (—$NR_1R_2$ is —$CONH_2$), surprisingly enough, are highly phytotoxic to certain plants and thus are useful and valuable as selective herbicides and plant growth regulants. None of these compositions including the known simple amide have been previously disclosed to have herbicidal utility. Examples of this second group of structures include but are not limited to the novel N,N-dimethyl, N-methyl-N-ethyl, N,N-diethyl, N,N-dipropyl, N,N-diisopropyl, N,N-dibutyl, N,N-dioctyl, N,N-didecyl, N,N-di(hydroxyethyl), N,N-diallyl, N-methyl-N-phenyl, N-ethyl-N-phenyl, N-methyl-N-(2-hydroxyethyl)-trichloro-2-furamides as well as the piperidide, pyrrolidide, morpholide, mono- and bis-piperazide, N,N'-piperazide, N'-methylpiperazide and thiomorpholide of trichloro-2-furoic acid. Yet another valuable but unrelated herbicide which can be made from the novel acid chloride of the invention is 3,4-dichloro-2-furamide. This can be accomplished by reduction of the trichloro-2-furamide, for example, by zinc in ammoniacal alcohol, by sodium amalgam or by hydrogen in the presence of a suitable catalyst such as platinum, palladium, or nickel. The rates of application and methods of formulation of 3,4-dichloro-2-furamide differ very little from those of trichloro-2-furamide. The princiual point of advantage of 3,4-dichloro-2-furamide over trichloro-2-furamide is enhanced activity pre-emergence on wild oats, a major weed of northern United States and Canada.

That the biological activity of the two groups of amides would be so critically dependent on the nature of the —$NR_1R_2$ moiety is most surprising and unexpected, in view of the biological innocuousness of the trichloro-2-furoic acid and esters. No reason or mechanism is suggested for the surprising biological activity of these compounds.

Both of these groups of biologically active amides may be used for their agronomical uses in various grades of purity ranging from the highly purified oils or crystalline products to a technical reaction crude. Furthermore, these biological compositions offer the advantage of compatibility with a host of other biologically active substances including herbicides in the tri- and tetra-chlorophenylacetic acids and the sodium borates and calcium borates, 2,4-D and other herbicidal phenoxy aliphatic acid and esters, simazine and other herbicidal triazines, monuron, fenuron, diuron and other herbicidal ureas, herbicidal chlorates, petroleum oils, hexachlorocyclopentadiene, pentachlorophenol, dinitro-o-alkylphenols, sodium trichloroacetate, and sodium 2,2-dichloropropionate, with fungicides such as the metal dimethyldithiocarbamates and ethylenebis-(dithiocarbamates), with insecticides such as benzene hexachloride, DDT, chlordane and the insecticidal carbamates, with fertilizers such as urea and ammonium nitrate, and various adjuvants and diluents well known to the art. Thus, these biocides may be used by themselves or made the subject of liquid or solid formulations ranging from the very simple to the most complex. For example, if it is desired these compositions may be made the subject of a liquid formulation by diluting, dispersing, dissolving or emulsifying with a surface active adjuvant or combination of these adjuvants in water or organic solvents such as petroleum hydrocarbons, alcohols, ketones, esters, glycols or combinations thereof. Or alternatively, the novel herbicides may be made up as solid formulations or powders, dusts, wettable dusts, granules and pellets using solid diluents such as talcs, clays, flours, starches, diatomaceous earths, mica, limes, carbonates and phosphates either finely divided, granular or pelleted in form.

These solid and liquid formulations facilitate handling and application and sometimes enhance herbicidal activity to more than an additive degree.

The liquid compositions, whether solutions or dispersions of the active agents in a liquid solvent and also the wettable powder or dust compositions of this invention may contain as a conditioning agent one or more surface active agents in amounts sufficient to render the composition readily dispersible in water. By the term surface active agents are included wetting agents, dispersing agents, emulsifying agents and the like. A satisfactory but not complete list of such agents is set forth in an article in "Soap and Chemical Specialties," vol. 31, No. 7, pages 50–61; No. 8, pages 48–61; No. 9, pages 52–67, and No. 10, pages 38(67), 1955. Other sources of adjuvant materials is set forth in Bulletin E–607 of the Bureau of Entomology and Plant Quarantine of the United States Department of Agriculture.

While the manner and method of application of the inventive compositions is varied and largely dependent upon variables such as the climatic conditions, crop treated, the weeds to be eradicated, the equipment available and the convenience of the user, a preferred embodiment of this invention is to apply these biocides as a spray after making them up as a liquid formulation comprised of several times their weight of non-phytotoxic carriers such as clay with small quantities of a wetting agent such as a commercial sodium alkylnaphthalene sulfonate and a dispersing agent such as a lignin sulfonate. For example, when the second group of amides are used as herbicides they are mixed as above and dispersed in water and sprayed pre-emergence in the area to be used for growing the desired crop such as onions, radishes, turf grasses, etc. Or alternatively, these compositions may be applied as a solid granular formulation. When used as fungicides the fungicidal compositions are applied to the foliage to be protected.

The rate of application as either fungicide or herbicide cannot be precisely stated due to factors such as the varying degree of resistance possessed by the pest species and crop, the stage of growth, the soil type and climatic conditions, but in general, the rates as a herbicide will be at least one-quarter of a pound of amide per acre and for reasons of cost will seldom exceed one hundred pounds per acre with the preferred range falling within one-half to fifty pounds per acre. Where the weeds are in an early stage of growth, they being more susceptible, will frequently respond to the rates from one-half to four pounds per acre while older weeds or weeds that are to be totally eradicated from ornamental beds or turf may require rates in excess of four pounds per acre. In those instances where the weed population has been allowed to accumulate unchecked or where mature plants are encountered, applications of up to fifty and even beyond this rate may be required. For eradication of deeply-rooted herbicide-resistant perennial weeds such as field bindweed, rates of ten to one hundred pounds are found best. When used as a fungicide, the rate of application will generally vary between 0.25 and ten pounds per acre.

The process of preparing the trichloro-2-furoyl chloride of this invention may be performed using a broad range of conditions. It may be run conveniently at sub or super or atmospheric pressures. The advantage of using superatmospheric conditions is that the reaction is accelerated requiring less time for completion. However, the gain in lessened reaction time is offset by the necessity of using more intricate equipment and introducing attendant safety hazards. For these reasons among others, atmospheric pressures are preferred.

Our novel process for preparing trichloro-2-furoyl chloride is most conveniently performed at temperatures where the starting material tetrachlorocoumalin will reflux. At pressures at or near atmospheric, this will be initially in the range of two hundred to two hundred and fifty degrees centigrade. The boiling point will, of course, shift as the reactions proceed, and as stated before, if desired, the boiling point can be raised by using superatmospheric pressures.

While there is considerable latitude as to the time of heating the tetrachlorocoumalin to effect standard conversion, at atmospheric pressures and at reflux the re-arrangement will require from three hours to forty-eight hours for substantial formation of the desired trichloro-2-furoyl chloride, depending upon whether sub or superatmospheric pressure is used, higher pressures favoring the shorter reaction time and lower pressures the longer times. The preferred embodiment is to heat the tetrachlorocoumalin at atmospheric pressure at its reflux temperature from five to twelve hours, during which time substantial conversion takes place. While the type of reaction vessel is not essential to the performance of this inventive process, certain advantages may be gained through the use of modifications and elaborations in the reaction vessel. For example, it is convenient to carry out the reaction in a vessel fitted with a means for fractionating so that the product can be distilled off as it is formed. This is possible since the trichloro-2-furoyl chloride is lower boiling than the starting material tetrachlorocoumalin. Or alternatively, the tetrachlorocoumalin and trichloro-2-furoyl chloride that is formed may be refluxed together for a period of time necessary for substantial conversion to have taken place. This at atmospheric pressure will take between ten to twenty-four hours. Then the reaction mixture containing some unreacted starting material as well as product is resolved through filtration or centrifugation. The usual adjuvants such as filter aids or activated carbon may be added if desired. Facilitation of the separation of the product may be obtained in this modification by adding a sufficient amount of a solvent to remove either of the two components as an extract or filtrate. For example, petroleum ether among other solvents, readily dissolves the product but is a poor solvent for the starting material and may thus expeditiously be added at this time. Improved yields are obtained in the reaction if air is excluded, to avoid oxidative side reactions.

The following examples are intended to illustrate the workings of this invention including such facets as the preparation of the pesticidal compositions, their formulation as herbicidal and fungicidal agents and the testing results obtained using these compounds. Except as set forth in the claims, these examples shall only serve to illustrate the invention and not limit it.

EXAMPLE 1

*Preparation of Trichloro-2-Furoyl Chloride*

To a three-liter flask fitted with a four foot fractionating column topped with a still head provided with means for controlling the reflux ratio is added three thousand, one hundred and fifty parts by weight of tetrachlorocoumalin prepared by the method of Roedig et al. (loc. cit.). The compound is heated to reflux under a nitrogen atmosphere for one hour until the still head temperature dropped to about one hundred and seventy-seven degrees centigrade. The product is taken off at 20:1 reflux ratio over the course of thirty-six hours, until the pot temperature reaches three hundred and forty degrees centigrade. At this point the distillation is stopped and the distillate collected and weighed. The colorless distillate is found by comparison of its infrared spectrum to a known sample to contain about eighty-two percent of the desired trichloro-2-furoyl chloride. The product is further purified by repeated low-temperature recrystallizations from hexane in which the product is soluble at room temperature. The several times recrystallized product melted at thirty-four degrees.

*Analysis.*—Calcd. for $C_5Cl_4O_2$: Cl, 60.7 percent. Found: Cl, 60.5 percent.

The structure of the product is confirmed by comparing its hydrolysis product to the known trichloro-2-furoic acid which has a melting point of one hundred and seventy-four to one hundred and seventy-five degrees centigrade (Hill and Jackson, Am. Chem. J. 12, 119 (1890).

The melting point of the hydrolysis product of the acid chloride of the invention is identical to that of the known trichloro-2-furoic acid, a mixed melting point was undepressed, and the infrared spectra were identical. The trichloro-2-furoyl chloride of the invention also yielded an amide of melting point one hundred and ninety-two degrees identical to the known trichloro-2-furamide and an ethyl ester of melting point sixty-three degrees, identical to the known ethyl trichloro-2-furoate.

EXAMPLE 2

*Preparation of Trichloro-2-Furamide From Trichloro-2-Furoyl Chloride*

Gaseous ammonia is bubbled through a solution of two hundred and thirty-four grams of trichlorofuroyl chloride in one liter of benzene at twenty degrees centigrade, until the contents are saturated with ammonia. After about two hours, the reaction mixture is filtered and the solids washed with water to remove ammonium chloride. The remaining insoluble product is recrystallized from methanol to obtain a yield of two hundred and eight grams of colorless crystalline solid, melting point one hundred and sixty-two to one hundred and sixty-three degrees.

*Analysis.*—Calcd. for $C_5HO_2Cl_3N$: Cl, 49.7 percent; N, 6.5 percent. Found: Cl, 49.6 percent; N, 6.5 percent.

EXAMPLES 3–36

*Preparation of N-Substituted Trichloro-2-Furamides* $(C_4Cl_4OCONR_1R_2)$

To a solution of trichloro-2-furoyl chloride in dry benzene is added two molar equivalents of the desired amine. After two hours at ten to fifteen degrees centigrade, the solution was washed with water to remove the amine hydrochloride, dried and the solvent distilled off. The resulting materials are recrystallized from alcohol, petroleum ether or benzene.

| Example No. | R₁ | R₂ | M.P., °C. | Percent N, Calcd. | Percent N, Found |
|---|---|---|---|---|---|
| 3 | Methyl | H | 153-5 | 6.2 | 6.2 |
| 4 | Isopropyl | H | 122-5 | 5.5 | 5.0 |
| 5 | n-Butyl | H | 69-70.5 | 5.2 | 5.1 |
| 6 | t-Butyl | H | 106-7 | 5.2 | 5.2 |
| 7 | n-Octyl | H | 63-4 | 4.3 | 4.3 |
| 8 | Cyclohexyl | H | 137-9 | 4.7 | 4.4 |
| 9 | Benzyl | H | 136-7 | 4.6 | 4.6 |
| 10 | Hydroxyethyl | H | 130-1 | 5.4 | 5.5 |
| 11 | Phenyl | H | 133-133.5 | 4.8 | 4.7 |
| 12 | o-Chlorophenyl | H | 93-4 | 4.31 | 4.2 |
| 13 | m-Chlorophenyl | H | 166-7 | 4.3 | 4.2 |
| 14 | p-Chlorophenyl | H | 165 | 4.3 | 4.2 |
| 15 | 3,4-dichlorophenyl | H | 202-4 | 3.9 | 3.8 |
| 16 | 2-carboxyphenyl | H | 239-242 | 4.2 | 4.2 |
| 17 | Methyl | Methyl | Oil | 5.8 | 5.8 |
| 18 | Ethyl | Ethyl | 67-9 | 5.2 | 5.1 |
| 19 | n-Propyl | n-Propyl | Oil | 4.7 | 4.6 |
| 20 | Isopropyl | Isopropyl | 54-5 | 4.7 | 4.1 |
| 21 | n-Butyl | n-Butyl | Oil | 4.3 | 3.8 |
| 22 | Isobutyl | Isobutyl | Oil | 4.3 | 3.3 |
| 23 | Hexyl | Hexyl | Oil | 3.7 | 3.4 |
| 24 | 2-ethylhexyl | 2-ethylhexyl | Oil | 2.4 | 2.9 |
| 25 | Methyl | Phenyl | 81-82.5 | 4.6 | 4.6 |
| 26 | Ethyl | do | 47-9 | 4.4 | 4.4 |
| 27 | Methyl | 2-hydroxyethyl | (¹) | 5.2 | 4.7 |
| 28 | 2-hydroxyethyl | do | 98-99.5 | 4.6 | 4.6 |
| 29 | Allyl | Allyl | 113-115 | 4.8 | 4.9 |
| 30 | bis(Ethylene) | | 226-9 | 6.2 | 5.2 |
| 31 | N'-methylpiperazide | | Oil | 9.4 | 9.3 |
| 32 | N'-phenylpiperazide | | Oil | 7.8 | 8.9 |
| 33 | Morpholide | | 79.5-81.5 | 4.9 | 4.8 |
| 34 | Piperidide | | 37-38 | 4.5 | 4.5 |

¹ Low melting solid.

EXAMPLE 35

*Trichloro-2-Thionofuramide*

Trichloro-2-furamide is heated with phosphorus pentoxide and distilled to obtain a good yield of trichloro-2-furonitrile, a crystalline solid, melting point thirty-three to thirty-four degrees.

*Analysis.*—Calcd. for $C_5Cl_3OH$: N, 7.1 percent. Found: N, 7.0 percent.

Trichloro-2-furonitrile is dissolved in pyridine and one molar equivalent of trimethyl amine and $H_2S$ bubbled through for nine hours. Water is added and the mixture filtered to obtain a tan solid having approximately the correct sulfur content for trichloro-2-thiofuramide. A sharp melting point could not be obtained because of a persistent impurity.

EXAMPLE 36

*3,4-Dichloro-2-Furamide*

To a refluxing solution of ten parts of trichloro-2-furamide in five hundred parts of ethanol was added sodium amalgam in small portions, with stirring, periodically titrating aliquots of the mixture for chloride by the Volhard titration until one molar equivalent of chloride per mole of trichloro-2-furamide was obtained. The mixture was then decanted from the mercury, evaporated to dryness, the sodium chloride extracted by water, and the undissolved solid fractionally crystallized from alcohol to obtain the known 3,4-dichloro-2-furamide, melting point one hundred and seventy-six degrees.

EXAMPLE 37

An area infested with wild oats (*Avena fatua*), is sprayed at the rate of six pounds per acre, prior to oat emergence, with 3,4-dichloro-2-furamide in wettable powder suspension. One month later, substantially complete wild oat control is observed in the treated area. Partial control (about fifty percent), is obtained with trichloro-2-furamide at the same rate.

EXAMPLE 38

Areas seeded to various weeds and crops are sprayed before emergence with various of the chemicals of the invention, at the rate of sixteen pounds per acre. The suppression of the various species was recorded two to three weeks later.

| Compound of Example | HERBICIDAL EFFECT* | | | | | |
|---|---|---|---|---|---|---|
| | Corn | Radish | Foxtail | Crab-grass | Pig-weed | Lambs-quarters |
| 2 | 2 | 0 | 4 | 4 | 4 | 4 |
| 18 | 0 | 0 | 3 | 4 | 3 | 3 |
| 19 | 3+ | 0 | 3 | 3 | 3 | 3 |
| 20 | 3+ | 0 | 3 | 4 | 3 | 3 |
| 29 | 0 | 0 | 3 | 3 | 3 | 2 |

*Rating Scale: 0=no effect; 1=slight suppression; 2=moderate suppression; 3=almost complete suppression; 4=complete suppression.

EXAMPLE 39

A typical emulsifiable oil formulation is the following:

Parts by weight
N,N-diisopropyl-3,4,5-trichloro-2-furamide _____ 10
"Atlox" emulsifier (polyoxyethylene sorbitan ester) __ 2
High aromatic naphtha _____ 20

The ingredients are blended to obtain an oil emulsifiable with water, and which can be sprayed as an emulsion.

EXAMPLE 40

A typical wettable powder formulation is the following:

Parts by weight
Trichloro-2-furamide _____ 25
Attapulgus clay _____ 69
Sorbit P (commercial wetting agent) _____ 1
Marasperse N (commercial dispersing agent) _____ 5

The ingredients are ground together in a hammer mill to prepare a powder which disperses upon agitation with water, and which can be sprayed as a suspension.

EXAMPLE 41

A typical granular formulation is the following:

Parts by weight
Trichloro-2-furamide _____ 20
Vermiculite granules _____ 80

The amide is dissolved in acetone, the solution admixed with the vermiculite, and the granules dried to remove the acetone. The formulation is applied by use of a spreader or by hand.

EXAMPLE 42

A typical mixed pesticide-fertilizer formulation for turf is the following:

| | Parts by weight |
|---|---|
| Commercial 6-6-6 fertilizer | 992 |
| Trichloro-2-furamide | 6 |
| 2,4-dichlorophenoxyacetic acid | 2 |

EXAMPLE 43

Test plots bearing a vigorous stand of seedlings of several weeds were sprayed with representative chemicals of the invention at rates of eight pounds per acre. After about one week, the effects of the chemicals on the plants were recorded (Table III).

TABLE III

| Compound of Example No. | Weed Species | | |
|---|---|---|---|
| | Crabgrass | Dock | Lambs-quarters |
| 16 | 3 | 2 | 3 |
| 19 | 2-3 | 3 | 4 |
| 24 | 3 | 2 | 2-3 |
| 28 | 3 | 2 | 3 |
| 33 | 4 | 3 | 3 |

Scale: 0=no effect; 1=slight damage; 2=moderate damage; 3=severe damage; 4=complete kill.

The compounds of the invention have utility also as fungicides and as chemical intermediates. In the latter regard, the halogen atoms on the furan ring may be replaced by nucleophilic reagents to introduce alkylamino-, arylamino-, amino, alkylmercapto, arylmercapto and other substituents, many of these products also having pesticidal activity. One or both of the double bonds in the furan ring may also be saturated by chlorine or bromine to produce more highly halogenated products also having in many cases pesticidal activity. The fungicidal activity of the compounds of the invention is of greatest value in the case of those compounds having relatively less phytotoxicity, since the major use for fungicides is on living plants. The following example illustrates the fungicidal activity of compounds of the invention.

EXAMPLE 44

The compounds of Examples 7, 11 and 13 were pulverized and dispersed in water at the concentration of 0.1 percent. Tomato plants infested with *Alternaria solani*, (the causative organism of "early blight disease"), were sprayed with these suspensions. At a later time, when similarly infected but unsprayed plants had developed, severe disease symptoms, the development of disease symptoms on the treated plants was substantially repressed.

We claim:

1. A process for preparing 3,4,5-trichloro-2-furoyl chloride which comprises heating tetrachlorocoumalin to a temperature of from about 200 degrees to about 340 degrees centigrade and maintaining the temperature in said range until a substantial amount of 3,4,5-trichloro-2-furoyl chloride is formed.

2. The process of preparing 3,4,5-trichloro-2-furoyl chloride comprising the step of heating tetrachlorocoumalin to a temperature at which it is converted to 3,4,5-trichloro-2-furoyl chloride and maintaining the tetrachlorocoumalin at such a temperature until a substantial amount of 3,4,5-trichloro-2-furoyl chloride is formed and isolating the trichloro-2-furoyl chloride by distilling off the product as the lower boiling component of the reaction mixture.

3. The process of preparing 3,4,5-trichloro-2-furoyl chloride comprising the step of heating tetrachlorocoumalin to a temperature at which it is converted to 3,4,5-trichloro-2-furoyl chloride and maintaining the tetrachlorocoumalin at such a temperature until a substantial amount of 3,4,5-trichloro-2-furoyl chloride is formed and isolating the 3,4,5-trichloro-2-furoyl chloride by extraction by a solvent in which the chloride product has substantially greater solubility than does the tetrachlorocoumalin.

4. The process of preparing 3,4,5-trichloro-2-furoyl chloride comprising the steps of heating tetrachlorocoumalin to a temperature of from about 200 degrees to about 250 degrees centigrade and maintaining the temperature in said range until a substantial amount of the chloride is formed.

5. A process for preparing 3,4,5-trichloro-2-furoyl chloride which comprises heating tetrachlorocoumalin until a substantial amount of 3,4,5-trichloro-2-furoyl chloride is formed and isolating the 3,4,5-trichloro-2-furoyl chloride by extraction with petroleum ether, in which the 3,4,5-trichloro-2-furoyl chloride is substantially more soluble than is the tetrachlorocoumalin.

References Cited in the file of this patent

UNITED STATES PATENTS

| 2,648,685 | Reppe et al. | Aug. 11, 1953 |
| 2,838,389 | Yoder | June 10, 1958 |
| 2,845,339 | Bluestone | July 29, 1958 |
| 2,961,449 | Moffett et al. | Nov. 22, 1960 |

OTHER REFERENCES

Hill et al.: Amer. Chem. J., vol. 12 (1890), pages 119 and 123-4.

Shriner et al.: Identification of Organic Compounds (Third Edition, 1948), pages 154-5.

Dunlop: The Furans (1953), pages 114-5.

Dunlop: The Furans (1953), pages 116 and 20.

Kawabe et al.: J. Pharm. Soc., Japan, vol. 80 (1960), pages 53-7.

Roedig et al.: Annalen der Chemie, vol. 636 (1960), page 1.

UNITED STATES PATENT OFFICE
CERTIFICATE OF CORRECTION

Patent No. 3,158,624　　　　　　　　　　　　　　November 24, 1964

Edward Leon et al.

It is hereby certified that error appears in the above numbered patent requiring correction and that the said Letters Patent should read as corrected below.

Column 2, line 52, for "is" read -- it --; column 3, line 63, for "princiual" read -- principal --; column 6, line 43, for "ninety-two" read -- sixty-two --.

Signed and sealed this 18th day of January 1966.

(SEAL)
Attest:

ERNEST W. SWIDER　　　　　　　　　　　　　　EDWARD J. BRENNER
Attesting Officer　　　　　　　　　　　　　　　　Commissioner of Patents

UNITED STATES PATENT OFFICE
CERTIFICATE OF CORRECTION

Patent No. 3,158,624　　　　　　　　　　　　November 24, 1964

Edward Leon et al.

It is hereby certified that error appears in the above numbered patent requiring correction and that the said Letters Patent should read as corrected below.

Column 1, line 15, strike out "heretofore unreported".

Signed and sealed this 15th day of October 1968.

(SEAL)
Attest:

Edward M. Fletcher, Jr.

Attesting Officer

EDWARD J. BRENNER

Commissioner of Patents